(12) United States Patent
Chen et al.

(10) Patent No.: US 8,059,206 B2
(45) Date of Patent: Nov. 15, 2011

(54) MOTION DETECTION METHOD UTILIZING 3D Y/C SEPARATION

(75) Inventors: Wen-Jyh Chen, Hsin-Chu Hsien (TW); Chia-Hao Hsiung, Taipei (TW); Ya-Wen Lu, Hsin-Chu (TW)

(73) Assignee: Realtek Semiconductor Corp., Hsinchu (TW)

( * ) Notice: Subject to any disclaimer, the term of this patent is extended or adjusted under 35 U.S.C. 154(b) by 1462 days.

(21) Appl. No.: 11/428,574

(22) Filed: Jul. 5, 2006

(65) Prior Publication Data

US 2007/0008432 A1 Jan. 11, 2007

(30) Foreign Application Priority Data

Jul. 5, 2005 (TW) ................ 94122712 A

(51) Int. Cl.
*H04N 7/12* (2006.01)
*H04N 9/64* (2006.01)

(52) U.S. Cl. ............... 348/701; 375/240.16
(58) Field of Classification Search ........... 348/701, 348/663, 666, 669, 702; 375/240.16, 240.29
See application file for complete search history.

(56) References Cited

U.S. PATENT DOCUMENTS

| | | | | |
|---|---|---|---|---|
| 4,651,211 A * | 3/1987 | Weckenbrock et al. | ...... | 348/702 |
| 4,736,252 A * | 4/1988 | Nakagawa et al. | ........... | 348/702 |
| 5,043,807 A | 8/1991 | Rabii | | |
| 5,430,500 A * | 7/1995 | Hoshino et al. | ............... | 348/701 |
| 5,457,498 A | 10/1995 | Hori | | |
| 5,473,389 A * | 12/1995 | Eto et al. | ........................ | 348/669 |
| 5,786,872 A * | 7/1998 | Miyazaki et al. | ............. | 348/669 |
| 6,188,445 B1 | 2/2001 | Taketani | | |
| 6,288,755 B1 | 9/2001 | Yun | | |
| 6,400,762 B2 | 6/2002 | Takeshima | | |
| 7,133,080 B2 * | 11/2006 | Kobayashi et al. | ........... | 348/663 |
| 7,274,408 B2 * | 9/2007 | Shan et al. | ..................... | 348/669 |
| 7,535,515 B2 * | 5/2009 | Bacche et al. | ................ | 348/666 |
| 2005/0062748 A1 | 3/2005 | Eitzmann | | |

FOREIGN PATENT DOCUMENTS

| | | |
|---|---|---|
| TW | 398157 | 7/2000 |
| TW | 560804 | 11/2003 |

* cited by examiner

*Primary Examiner* — Gims Philippe
(74) *Attorney, Agent, or Firm* — Thomas, Kayden, Horstemeyer & Risley, LLP

(57) ABSTRACT

A motion detection method for detecting the difference in colors and an object position between a current frame and a previous frame through processing a composite video signal corresponding to both frames. The method includes: calculating a plurality of composite signal values included in the composite video signal to generate a calculation result; determining whether the calculation result conforms to a requirement to obtain a detecting result; and determining whether the colors and the object position are changed in two frames corresponding to the composite video signal according to the detecting result.

18 Claims, 4 Drawing Sheets

MOTION DETECTION METHOD UTILIZING 3D Y/C SEPARATION

BACKGROUND OF THE INVENTION

1. Field of the Invention

The present invention provides a method for detecting movement of an object in frames, and particularly, for a motion detection method utilizing 3D Y/C separation.

2. Description of the Prior Art

At present, TV signal technology transforms R/G/B colors into composite video signals while signal transmission. The composite video signal includes a luminance signal Y and a chrominance signal C, wherein the chrominance signal is further classified into two chromatic signals U and V. The two chromatic signals are carried on a carrier wave with a ninety degrees phase difference. Due to TV signals being transmitted via the composite video signals, it is necessary to decode the received composite video signal to separate the luminance signal Y and the chrominance signal C, and it is a well-known operation called Y/C separation. However, there are many methods to execute Y/C separation, for example, 2D Y/C separation and 3D Y/C separation. Deciding what kinds of Y/C separation method will be executed is usually in accordance with the motion detection result from an object in frames. Related arts about motion detection are disclosed in U.S. Pat. Nos. 5,430,500 and 5,786,872.

SUMMARY OF THE INVENTION

Therefore, one objective of the present invention is to provide a motion detection method to execute Y/C separation on a composite signal according to motion detection result.

According to an embodiment of the claimed invention, a motion detection method utilizing 3D Y/C separation is disclosed. The motion detection method includes: focusing a specific block in a current frame to execute 3D separation on a composite video signal; generating a reference luminance signal; and determining whether the specific block has grids according to the reference luminance signal; where if the specific block has grids, the specific block includes a moving object.

According to an embodiment of the claimed invention, further discloses a motion detection method utilizing 3D Y/C separation. The motion detection method includes:

focusing a specific block in a current frame to execute 3D separation on a composite video signal; generating a reference chrominance signal; and determining whether the specific block has a cross color effect according to the reference chrominance signal; where if the specific block has a cross color effect, the specific block includes a moving object.

The claimed invention further discloses a motion detection method utilizing 3D Y/C separation. The motion detection method determines whether a specific block has color (i.e. R/G/B) according to composite video signals in a current frame, and the method includes: sampling a plurality of composite signal values from composite video signals; generating a plurality of differences according to the composite signal values of the specific block in a current frame and a previous frame; and comparing the differences with a threshold value; where if the specific block is determined to be colorless (i.e. black and white), and all differences are over the threshold value, the specific block includes a moving object.

These and other objectives of the present invention will no doubt become obvious to those of ordinary skill in the art after reading the following detailed description of the preferred embodiment that is illustrated in the various figures and drawings.

DETAILED DESCRIPTION

At present, standard TV signal comprises National Television System Committee (NTSC) signal and Phase Alternation Line (PAL) signal and these signals are composite signal. A composite video signal includes two parts, a luminance signal and a chrominance signal, wherein the chrominance signal is further classified into two chromatic signals U and V. The two chromatic signals are carried on a carrier wave with ninety degrees phase difference. Taking NTSC standard for example, in a frame, the carrier phase of two continuous horizontal scanning lines are reversed. Furthermore, on a horizontal scanning line, the carrier phase of two continuous frames are also reversed. Therefore, for the composite video signal of every pixel in the frame, the chromatic signal (U or V) on two continuous horizontal scanning lines in one frame is carried on reversed carrier signals; similarly, the chromatic signal (U or V) on the same horizontal scanning line in two continuous frames is also carried on reversed carrier signals. The standard PAL differs from the NTSC standard by exchanging the sign of the V signal on every scanning line when the composite video signal is transferred. In other words, in the same frame, two continuous horizontal scanning lines in an odd field have a ninety degrees phase difference; that is, two horizontal scanning lines separated by another horizontal scanning line are phase reversed. Similarly, two continuous horizontal scanning lines in an even field also have a ninety degrees phase difference; that is, two horizontal scanning lines separated by another horizontal scanning line are phase reversed. For two continuous frames, the carrier phase of the same horizontal scanning line has a ninety degrees phase difference between two neighboring frames, and on the same horizontal scanning line, two frames separated by another frame are phase reversed.

The following description discloses a preferred embodiment of the present invention. Although the embodiment takes the above-mentioned TV standards as examples, utilizing characteristics of the present invention to process other TV signal types also belong to the claimed invention.

Figure 1:
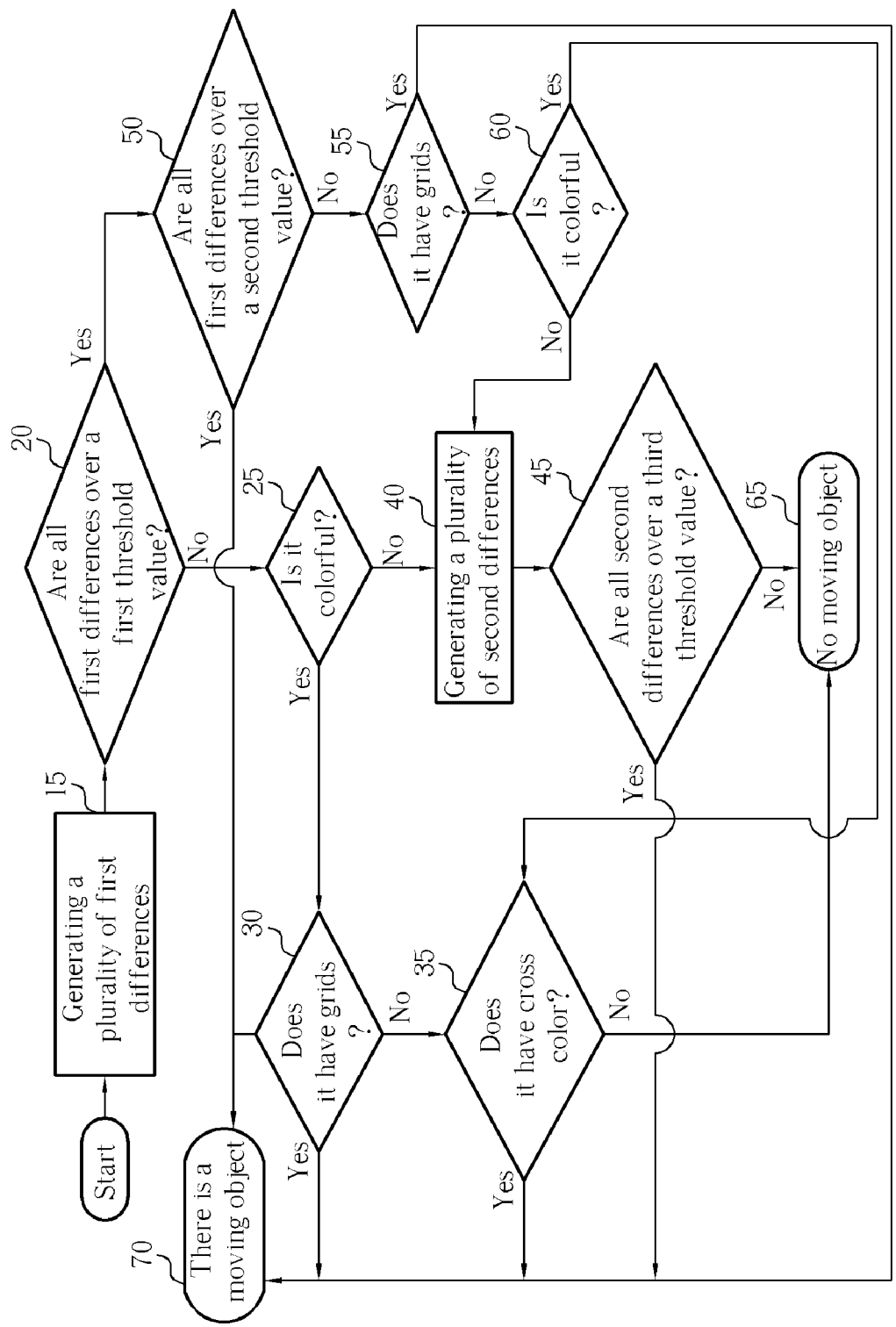
FIG. 1 is a motion detection flowchart according to an embodiment of the present invention.

Please refer to FIG. 1. FIG. 1 is a motion detection flowchart according to an embodiment of the present invention. In this embodiment, a current frame is firstly divided into several blocks, and then focusing on a specific block for carrying out the procedure of motion detection. Please note that the composite video signals in the embodiment are sampled to generate a plurality of composite signal values through a sampling procedure. The motion detection method steps include:

Step 15: compare composite video signals corresponding to the same specific block in a current frame and a previous frame to generate at least one first difference.

Step 20: if the first difference is over a first threshold value, jump to step 50; otherwise, go to step 25.

Step 25: determine whether the specific block has color; if YES, go to step 30; if No, jump to step 40.

Step 30: utilize 3D Y/C separation to determine whether the specific block conforms to a requirement (in the embodiment, the requirement of step 30 means grids); if YES, jump to step 70; otherwise, go to step 35.

Step 35: utilize 3D Y/C separation to determine whether the specific block conforms to a requirement (in the embodiment, the requirement of step 35 means cross color effect); if YES, jump to step 70; otherwise, go to step 65.

Step 40: compare composite signal values corresponding to the same specific block in two continuous frames to generate at least a one second difference.

Step 45: if the second difference is over a third threshold value, jump to step 70; otherwise, go to step 65.

Step 50: if all first differences are over a second threshold value, jump to step 70; otherwise, jump to step 55.

Step 55: utilize 3D Y/C separation to determine whether the specific block conforms to a requirement (in the embodiment, the requirement of step 55 means grids); if YES, jump to step 70; otherwise, go to step 60.

Step 60: determine whether the specific block has color; if YES, jump to step 35; otherwise, jump to step 40.

Step 65: the specific block does not include a moving object.

Step 70: the specific block includes a moving object.

According to the above steps, step 15 compares a low frequency part of the composite video signal to generate the first difference, wherein the low frequency part is obtained through utilizing a low-pass filter to filter the composite video signal. Additionally, step 25 and step 60 determine whether the specific block is colorful according to the composite signal values in the same frame.

According to the above steps of motion detection, the embodiment applies a low-pass filter to filter out the low frequency component of composite video signal, that is, the luminance signal of a composite video signal. If the low frequency component of the composite video signal of the same specific blocks between the previous frame and the current frame has difference greatly, that means the composite video signal has obvious variation between two frames. This condition has possibly resulted from a moving object in the specific block. Therefore, the embodiment sets a first difference, a first threshold value, and a second threshold value (the second threshold value is greater than the first threshold value), wherein the first difference value represents the difference of low frequency component of two specific blocks and the two specific blocks is corresponding to the same position in previous frame and current frame respectively. Therefore, if the first difference is larger than the second threshold value, it can directly determine that the specific block includes a moving object. If the first difference is between the first and second threshold value, the calculation result of 3D Y/C separation of the composite video signal is utilized to determine whether the specific block includes a moving object; and if the specific block does not include a moving object, other methods are used to determine whether the specific block includes a moving object. Otherwise, if the first difference is less than the first threshold value, that means the composite video signal has not greatly changing between the previous frame and the current frame, the specific block would be assumed that having no moving object. Next, it is determined whether the specific block has colors, and in accordance with the result, different methods are used to determine whether the specific block includes moving object.

In this embodiment, if the specific block is colorless, that means the composite video signal only includes the luminance signal, and no chrominance signal. Therefore, when the difference of the composite value of the two specific blocks between previous frame and current frame is over a third threshold value, it can be determined that the specific block includes a moving object. On the other hand, if the specific block has color, then it must be further determined whether the specific block conforms to a requirement to determine whether the specific block includes a moving object. In this embodiment, the requirement is corresponding to grids or cross color effects. If the first difference is between the first and second threshold values, the specific block is more likely to include a moving object. The method therefore first determines whether the specific block corresponds to grids. If yes, then it is directly determined that the specific block includes a moving object; otherwise, other methods will be utilized to detect the moving object, where the method is selected according to whether the frame has color or not.

The 3D Y/C separation method described in the embodiment adds two sample values of the composite signal; and then divides the additive value by 2 to get the luminance signal Y, wherein the two sample values are located at the same position in previous frame and current frame. Additionally, the 3D Y/C separation method described in the embodiment also subtracts two sample values; and then divides the subtractive value by 2 to get the chrominance signal C. For the NTSC standard, the previous frame and the current frame are two continuous frames, but for the PAL standard, the previous frame and the current frame are two frames separated by another frame. Furthermore, the previous frame and the current frame respectively include a plurality of horizontal scanning lines. This embodiment utilizes a frame buffer to save horizontal scanning lines corresponding to the previous frame and utilizes a line buffer to save horizontal scanning lines corresponding to the current frame.

Figure 2:
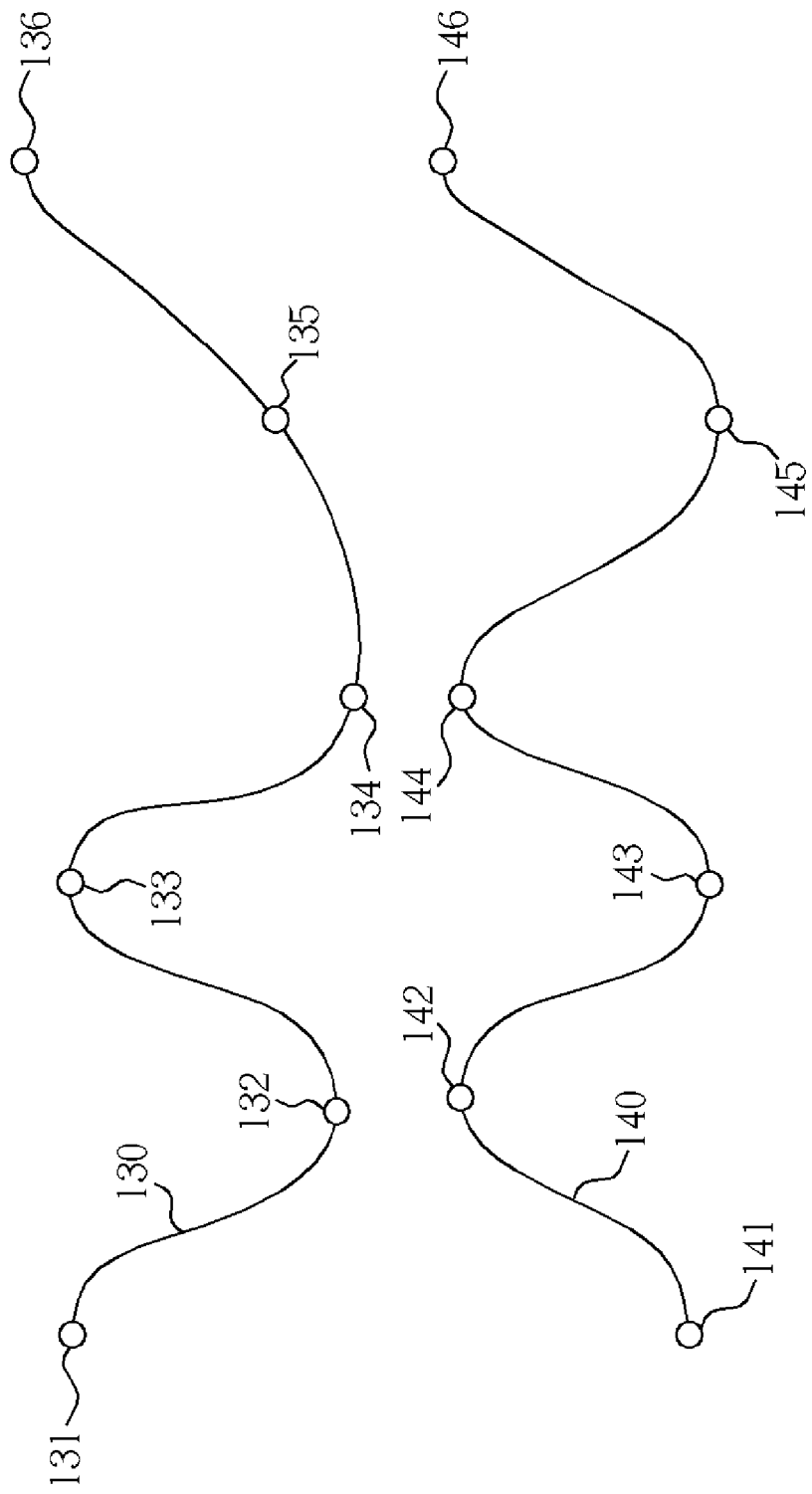
FIG. 2 is a diagram of a sample result of sampling the reference luminance signal corresponding to a plurality of scanning lines in the specific block.

There are many methods to determine whether the specific block has grids (steps 30 and 55) according to the calculation result of 3D Y/C separation. For example, executing 3D Y/C separation for composite video signals corresponding to the specific block in the previous frame and the current frame to obtain the reference luminance signal Y, then respectively sampling the reference luminance signals corresponding to scanning lines in the specific block will obtain a diagram of sampling result as shown in FIG. 2. As FIG. 2 shows, the embodiment samples a plurality of sample points 131-136 and 141-146 from the reference luminance signals 130 and 140 respectively. Next, the difference value (the first difference value set) between two neighboring sample points from sample points 131 136 and the difference value (the second difference value set) between two neighboring sample points from sample points 141-146 is calculated. If the sign of the first difference value set is changing alternately; the sign of the second difference value set is also changing alternately; every difference value is over a fourth threshold value; and the sign of the difference value in the first difference value set is different from the sign of the difference value in corresponding position of the second difference value set (that is, the luminance signals 130 and 140 are phase reversed); then the specific block is determined to have grids. For example, the sample points 131-134 of the reference luminance signal 130 and the sample points 141-144 of the reference luminance signal 140 illustrate the condition described above as shown in FIG. 2. Please note that, due to the difference value between sample points 134 and 135 being less than the fourth threshold value, it is likely that no grid appears. Additionally, compared with the sign of the difference value between sample points 145 and 146, as the sign of the difference value between sample points 135 and 136 is not changed, it is also likely that no grid appears. In the NTSC standard, the above-mentioned scanning lines are two continuous horizontal scanning lines; but in the PAL standard, the above-mentioned scanning lines are two horizontal scanning lines separated by another scanning line. Meanwhile, in this embodiment, the numbers of scanning lines to be analyzed in the specific block are decided by the designer.

Figure 3:
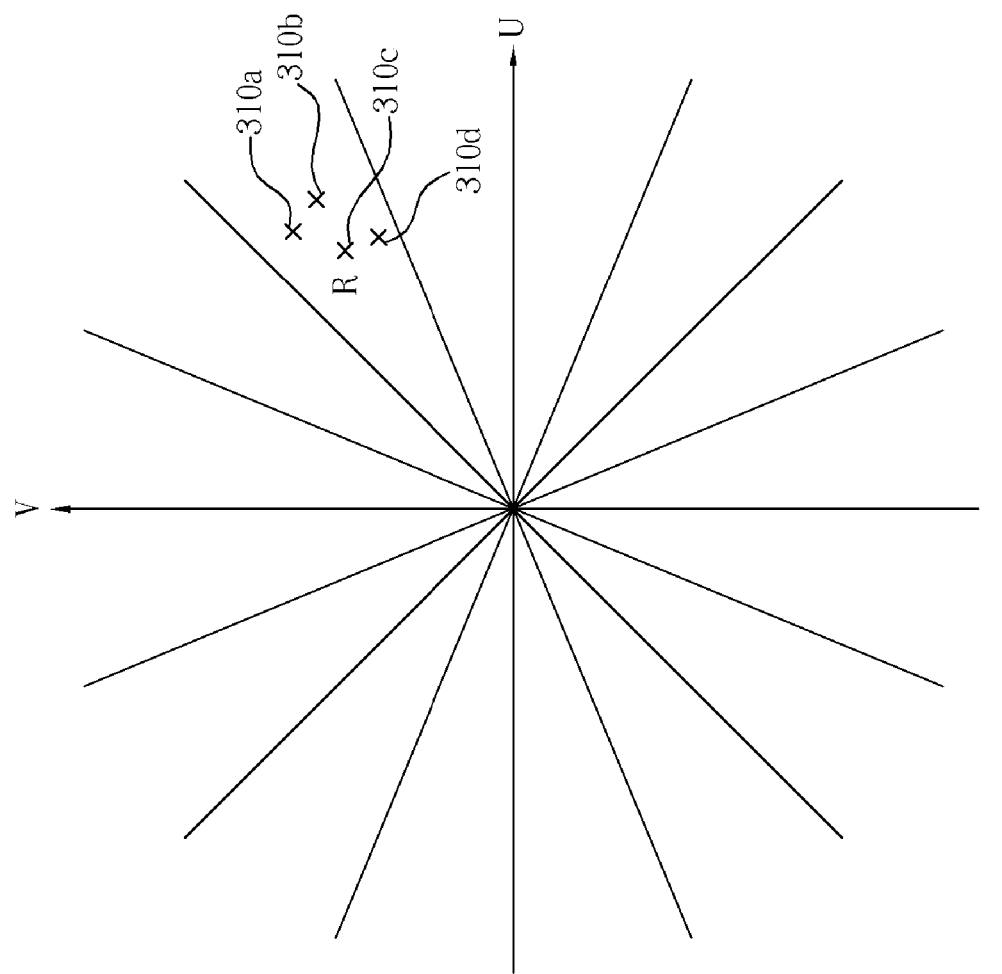
FIG. 3 is a diagram of (U, V) pairs and a U-V plane.

Similarly, in this embodiment, there are many methods to utilize the calculation result to execute step 35 to determine whether the specific block is cross color. For example, executing 3D Y/C separation for composite video signals corresponding to the specific block in the previous frame and the current frame to obtain the reference chrominance signal C, then respectively sampling the reference chrominance signal C corresponding to scanning lines in the specific block (if the sample point is located at n*(pi/2) degree on a carrier wave, the reference chrominance signal C will only include a chromatic signal U or V), and combining two neighboring chrominance signals C on one scanning line to form a (U, V) pair. Next, plurality of (U, V) pairs at the same position on different scanning lines are obtained. If those (U, V) pairs are not positioned in a preset region on the U-V plane, the specific block is determined to have no cross color. As shown in FIG. 3, (U, V) pairs 310a-310d are positioned in the region R, it is determined that the specific block does not have cross color effects. Otherwise, the specific block has cross color effects. Additionally, in the embodiment, due to two continuous horizontal scanning lines being phase reserved, it is necessary to change the sign of every (U, V) pair separated by one scanning line to determine whether the (U, V) pairs are positioned inside the preset region. It is worth noting that for the NTSC standard, the above-mentioned scanning lines means two continuous horizontal scanning lines; but for the PAL standard, the above-mentioned scanning lines means two horizontal scanning lines separated by another scanning line. Additionally, in this embodiment, the numbers of analyzed scanning lines in the specific block could be decided by the designers. Similarly, the number of sample points in one scanning line could also be decided by the designers.

Figure 4:
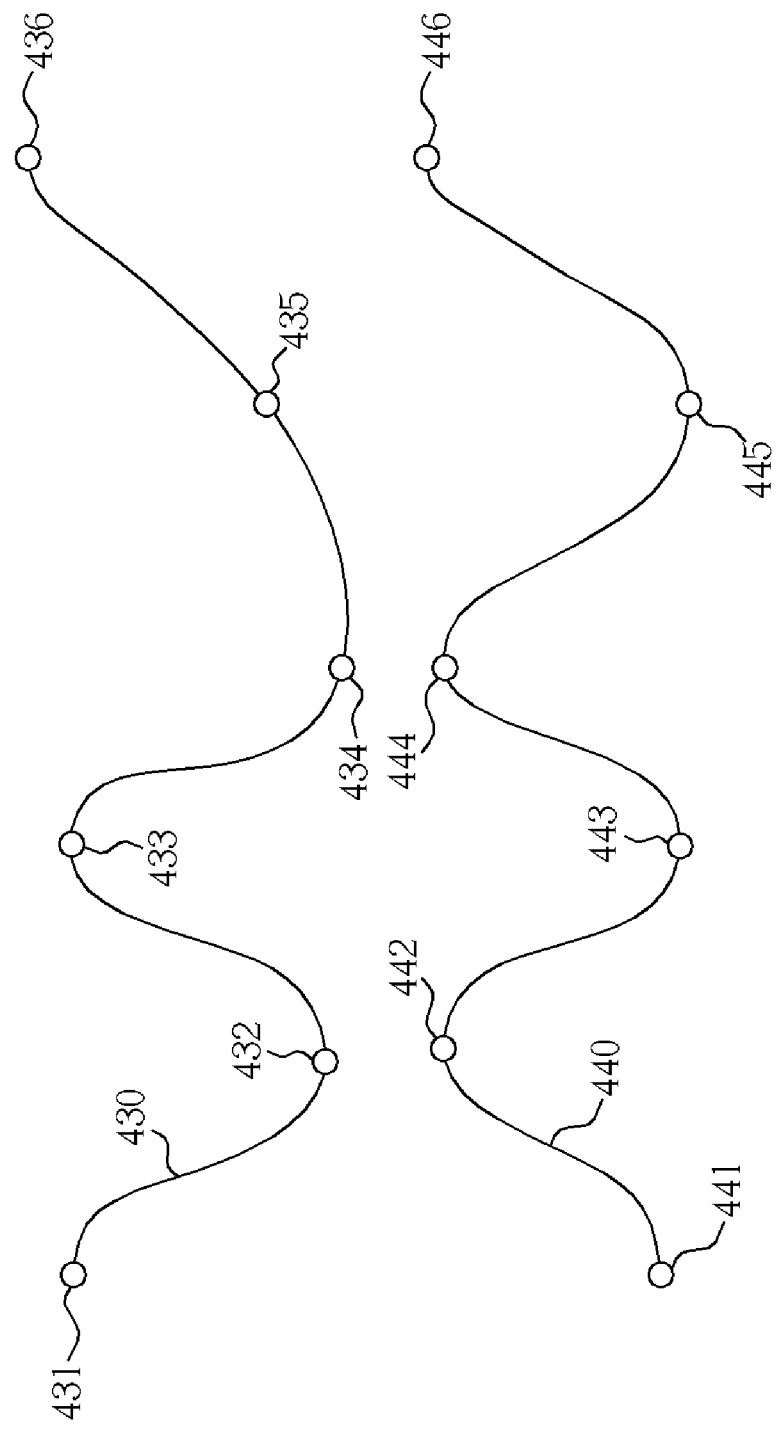
FIG. 4 is a diagram of a sample result of sampling the composite video signal corresponding to a plurality of scanning lines in the specific block.

In this embodiment, there are many methods to determine whether the specific block has color. For example, one method involves respectively sampling composite video signals corresponding to a plurality of scanning lines in the specific block to obtain a sample result diagram as shown in FIG. 4. As illustrated in FIG. 4, the embodiment samples a plurality of sample points 431-436 and 441-446 from the composite video signals 430 and 440. Next, the difference value (the third difference value set) between two continuous sample points from sample points 431-436 and the difference value (the fourth difference value set) between two continuous sample points from sample points 441-446 is calculated. If the sign of the third difference value set is changing alternately; the sign of the fourth difference value set is changing alternately; all difference values are over a fifth threshold value; and the sign of the difference value in the third difference value set is different from the sign of the difference value in the corresponding position of the fourth difference value set (that is, the composite signals 430 and 440 are phase reversed); then the specific block is determined to have color. For example, the sample points 431-434 of the composite video signal 430 and the sample points 441-444 of the composite video signal 440 illustrate the condition described above as shown in FIG. 4. Please note that, due to the difference value between sample points 434 and 435 being less than the fifth threshold value, it appears colorless. Additionally, compared to the difference value between sample points 435 and 436 of the composite video signal 430 and the difference value between sample points 445 and 446 of the composite video signal 440, as the sign of the two difference values is not changed, it also appears colorless. Again, for the NTSC standard, the above-mentioned scanning lines means two continuous horizontal scanning lines; but for the PAL standard, the above-mentioned scanning lines means two horizontal scanning lines separated by another scanning line. Additionally, in this embodiment, the numbers of analyzed scanning lines in the specific block could be decided by the designers. Similarly, the number of sample points in one scanning line could be also decided by the designers.

Consequently, the present invention carries out the motion detection and further detect whether the frame has color or variant that in order to decide what kind of Y/C separation method will be applied to decode the composite video signal. For example, 3D Y/C separation, 2D Y/C separation or mixed Y/C separation is utilized according to the detection result.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A motion detection method for detecting a composite video signal, the method comprising:
    calculating a plurality of composite signal values included in the composite video signal to generate a calculation result;
    determining whether the calculation result exceeds a threshold;
    responsive to a determination that the calculation result exceeds the threshold, determining that the composite video signal is in a motion state; and
    responsive to a determination that the calculation result does not exceed the threshold:
        determining whether the calculation result conforms to a requirement to obtain a detecting result; and
        determining whether the colors or the object position are changed in two frames that correspond to the composite video signal according to the detecting result.

2. The method of claim 1, wherein the step of calculating a plurality of composite signal values to generate a calculation result comprises:
    sampling the composite video signal to generate the plurality of composite signal values corresponding to a current frame and a previous frame; and
    calculating the composite signal values corresponding to the current frame and the previous frame to obtain the calculation result.

3. The method of claim 2, wherein the step of calculating a plurality of composite signal values to generate a calculation result further comprises:
    obtaining the calculation result according to addition operation of the composite signal values corresponding to the current frame and the previous frame.

4. The method of claim 3, wherein the addition operation is applied to generate a plurality of reference luminance signals or a plurality of reference chrominance signals.

5. The method of claim 2, wherein the current frame and the previous frame mean two continuous frames or two frames separated by another frame.

6. The method of claim 2, wherein the requirement corresponds to grids or a cross color effect.

7. The method of claim 1, wherein the calculation result comprises a plurality of reference luminance signals, and the step of determining whether the calculation result conforms to a requirement further comprises:
    determining whether the difference between sample values of the reference luminance signals is less than a threshold value.

8. A motion detection method for detecting a composite video signal, the method comprising:
    calculating a plurality of composite signal values included in the composite video signal to generate a calculation result;
    determining whether the calculation result conforms to a requirement to obtain a detecting result;
    determining whether the colors or the object position are changed in two frames that correspond to the composite video signal according to the detecting result;
    wherein the step of calculating a plurality of composite signal values to generate a calculation result comprises:
        sampling the composite video signal to generate the plurality of composite signal values corresponding to a current frame and a previous frame;
        calculating the composite signal values corresponding to the current frame and the previous frame to obtain the calculation result; and
    wherein the step of sampling the composite video signal comprises:
        utilizing a frame buffer to save a plurality of horizontal scanning lines corresponding to the previous frame;
        utilizing a line buffer to save a plurality of horizontal scanning lines corresponding to the current frame; and
        wherein the composite signal values are obtained by sampling the horizontal scanning lines.

9. The method of claim 8, wherein the horizontal scanning lines are identified as two continuous horizontal scanning lines or two horizontal scanning lines separated by another horizontal scanning line.

10. A motion detection method for detecting a composite video signal, the method comprising:
    calculating a plurality of composite signal values included in the composite video signal to generate a calculation result;
    determining whether the calculation result conforms to a requirement to obtain a detecting result;
    determining whether the colors or the object position are changed in two frames that correspond to the composite video signal according to the detecting result;
    wherein the calculation result comprises a plurality of reference luminance signals, and the step of determining whether the calculation result conforms to a requirement further comprises:
    determining whether sample values of the reference luminance signals have continuous variances greater than a threshold value, to generate the detecting result.

11. The method of claim 10, wherein the step of determining whether sample values of the reference luminance signals have continuous variances greater than a threshold value to generate the detecting result further comprises: determining whether two neighboring difference values have sign variance, wherein the difference value means a variation between two neighboring sample values.

12. The method of claim 10, wherein the reference luminance signals are obtained by calculating the composite signal values corresponding to a current frame and a previous frame, or directly calculating the composite signal values corresponding to a current frame.

13. A motion detection method for detecting a composite video signal, the method comprising:
    calculating a plurality of composite signal values included in the composite video signal to generate a calculation result;
    determining whether the calculation result conforms to a requirement to obtain a detecting result;
    determining whether the colors or the object position are changed in two frames that correspond to the composite video signal according to the detecting result;
    wherein the calculation result comprises sample values of a plurality of reference chrominance signals, and the step of determining whether the calculation result conforms to a requirement further comprises:
    determining whether the sample values of the chrominance signals are collected in a specific range on a U-V plane, to generate the calculation result; and
    wherein U and V represent chromatic signals of the chrominance signals.

14. The method of claim 13, wherein the reference chrominance signals are obtained by calculating the composite signal values corresponding to a current frame and a previous frame.

15. A motion detection method for detecting a composite video signal, the method comprising:
    calculating a plurality of composite signal values included in the composite video signal to generate a calculation result;
    determining whether the calculation result conforms to a requirement to obtain a detecting result;
    determining whether the colors or the object position are changed in two frames that correspond to the composite video signal according to the detecting result;
    utilizing a filter to filter the composite video signals to obtain a filtering result;
    generating a difference according to the filtering result; and
    wherein the step of determining whether the calculation result conforms to a requirement further comprises:
    determining whether the difference is over a threshold value.

16. A motion detection method, comprising:
    separating a composite video signal into a luminance signal Y and a chrominance signal C;
    selecting a first frame and a second frame from at least one of the luminance signal Y or chrominance signal C;
    calculating the first and second frames to obtain a calculating result;
    determining whether the calculating result exceeds a threshold value;
    responsive to a determination that the calculating result exceeds the threshold value, determining that the composite video signal has a moving object;
    responsive to a determination that the calculating result does not exceed the threshold value, determining that the composite video signal has a moving object if the calculating result indicates that a color has changed between the first and second frames; and
    wherein, calculating the first and second frames is adding the two frames or subtracting the two frames, where when the first and second frames are selected from the luminance signal Y, the calculating the first and second frames is adding the two frames.

17. The method of claim 16, wherein the first and second frames are neighboring frames.

18. The method of claim 16, wherein the motion detection method is utilized in TV system.

* * * * *